UNITED STATES PATENT OFFICE.

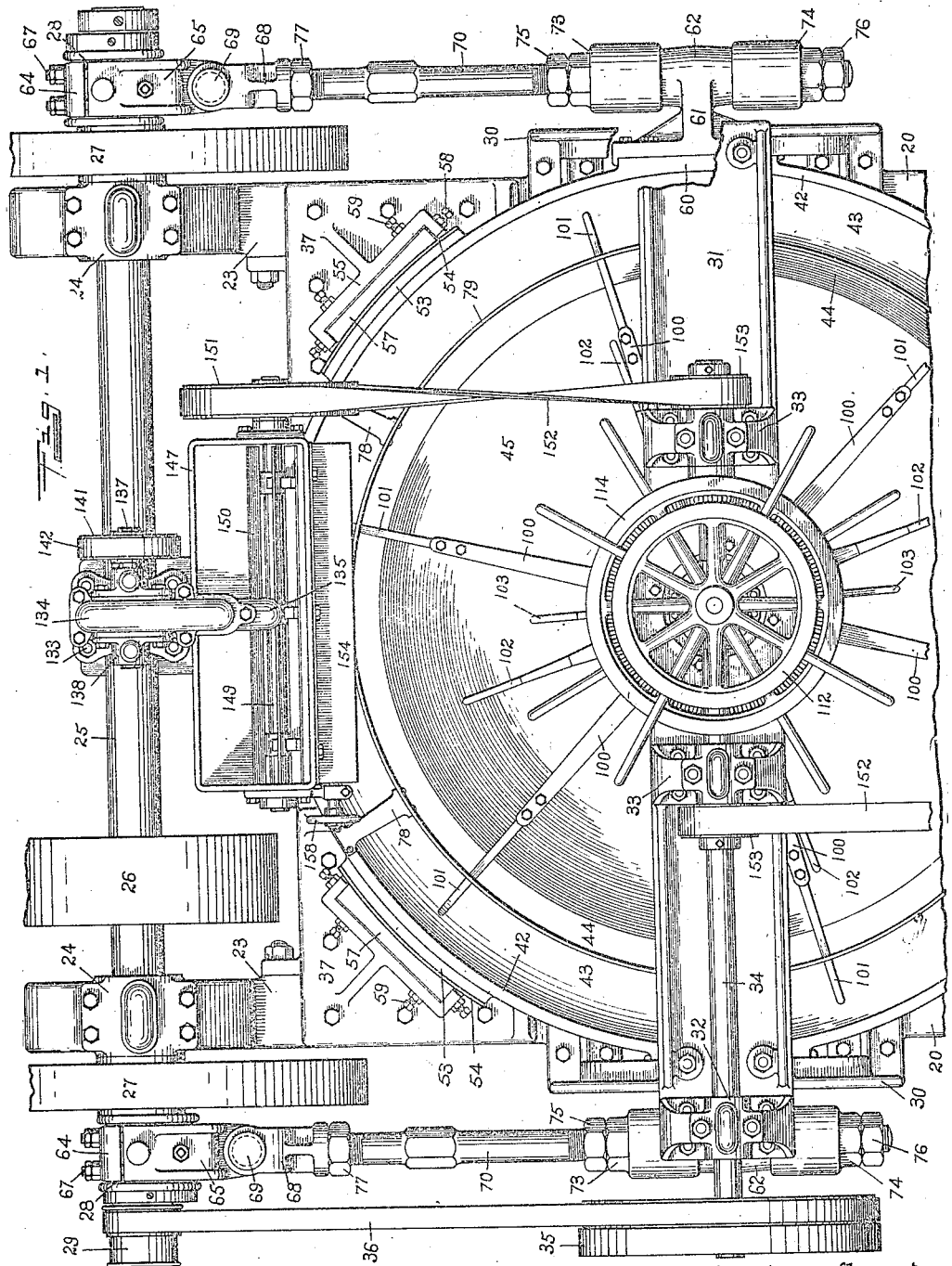

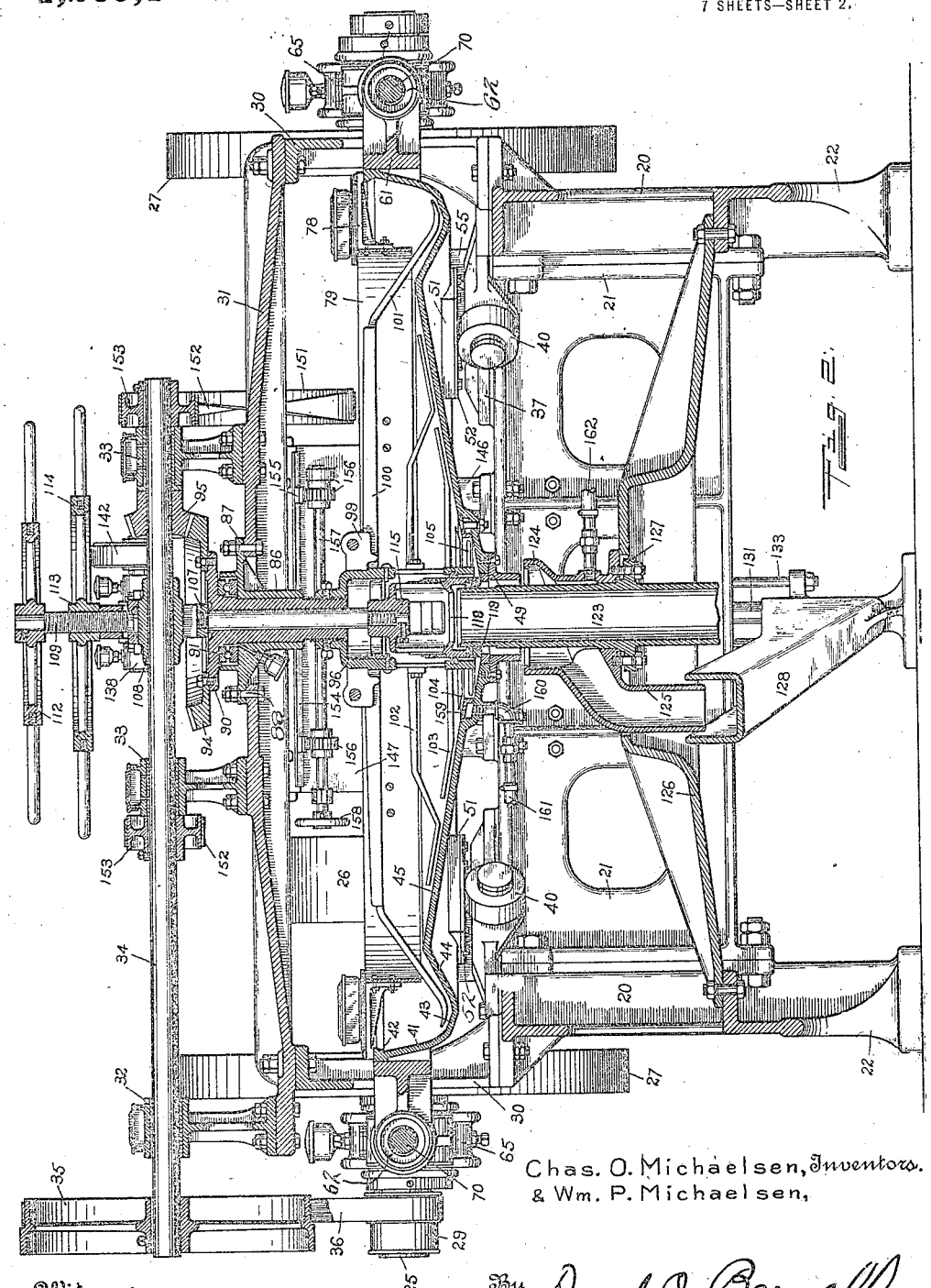

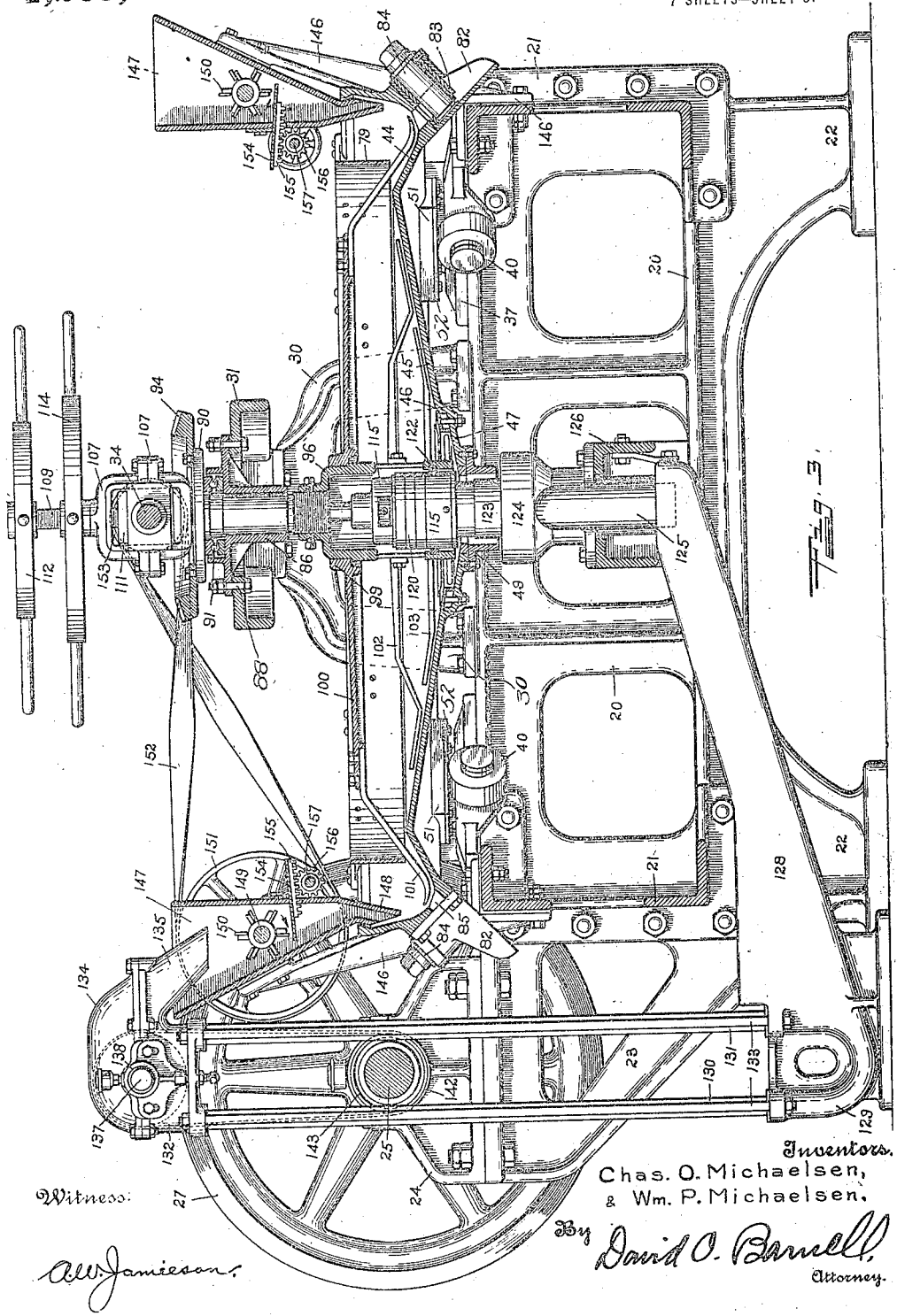

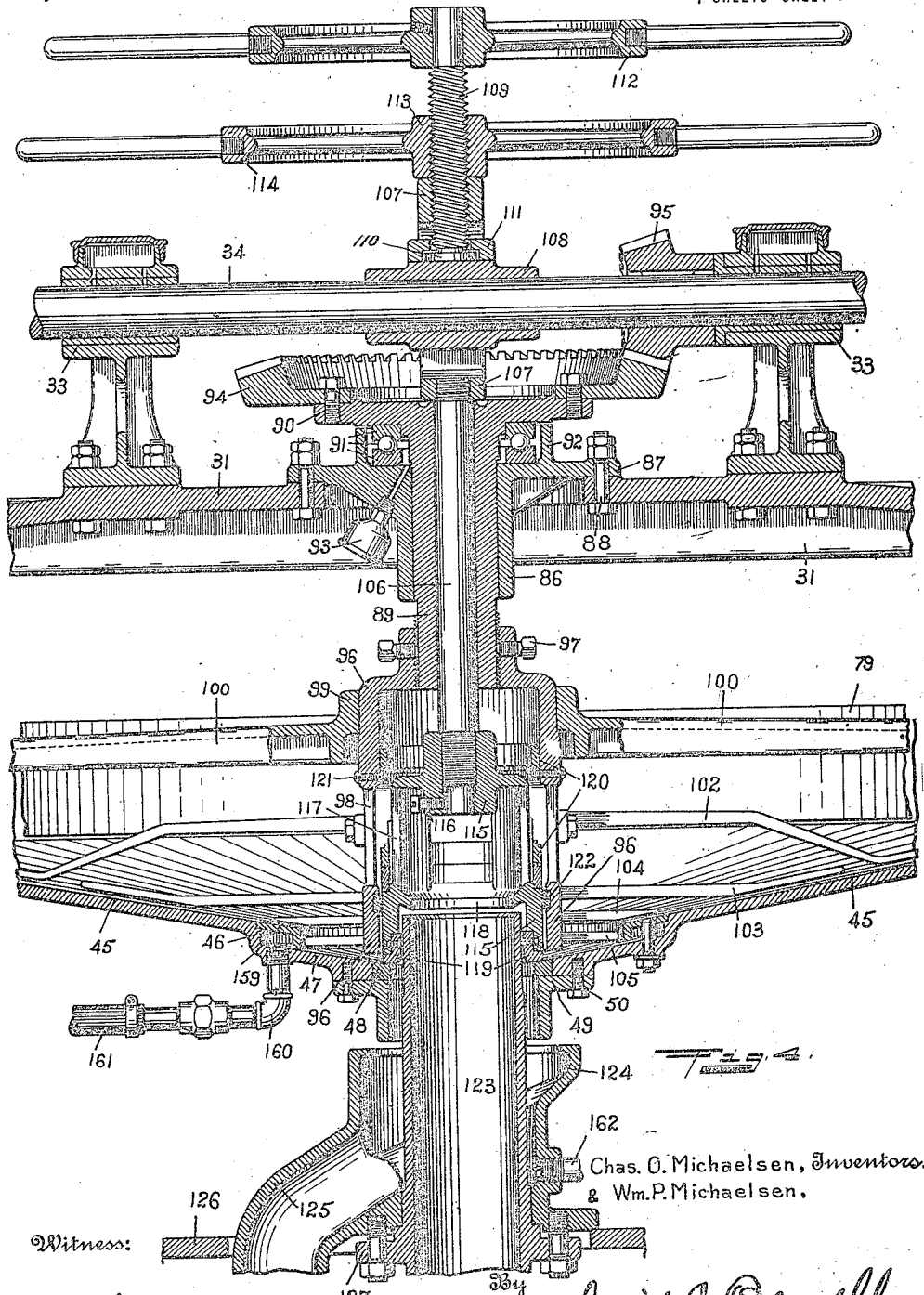

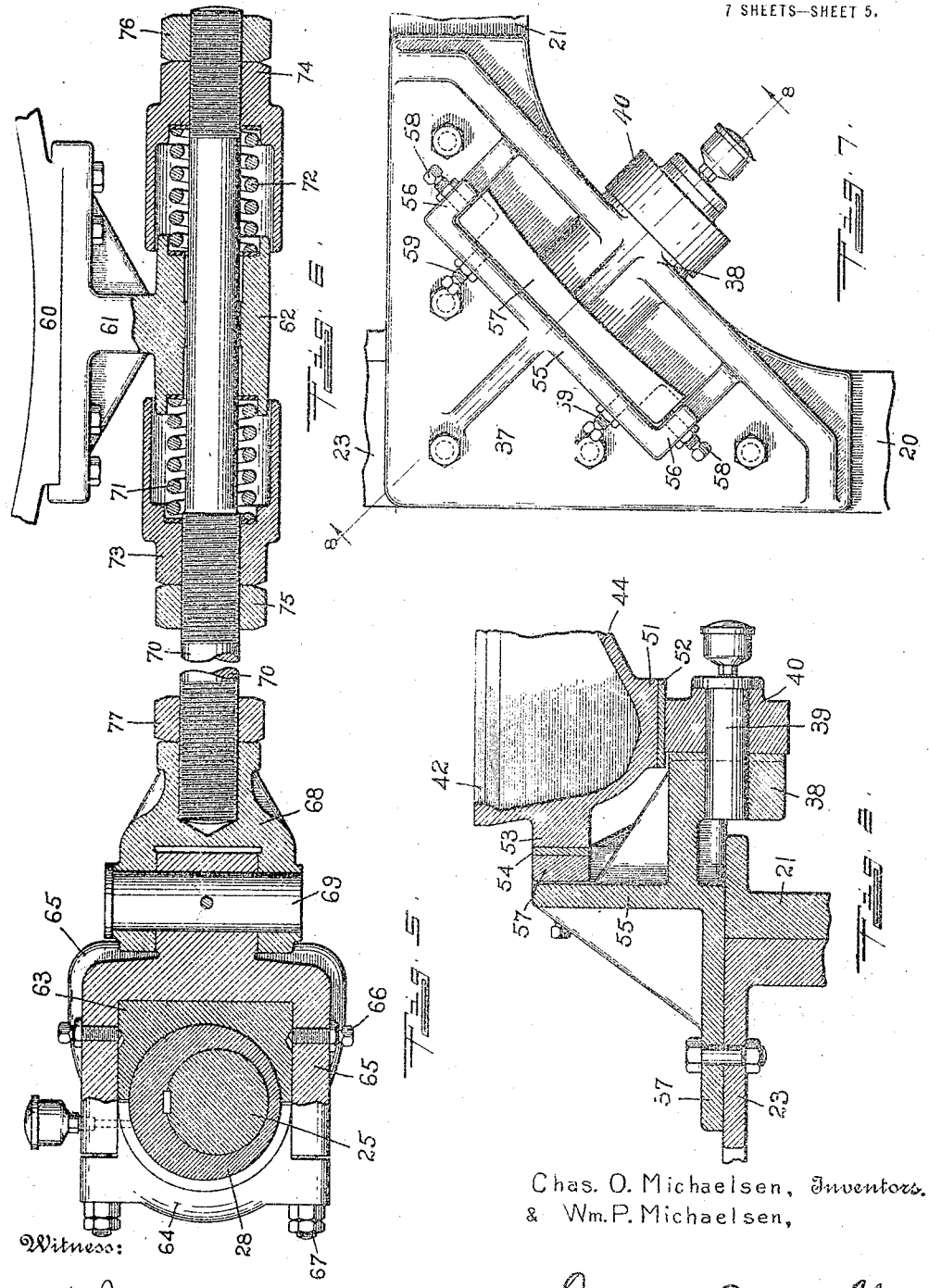

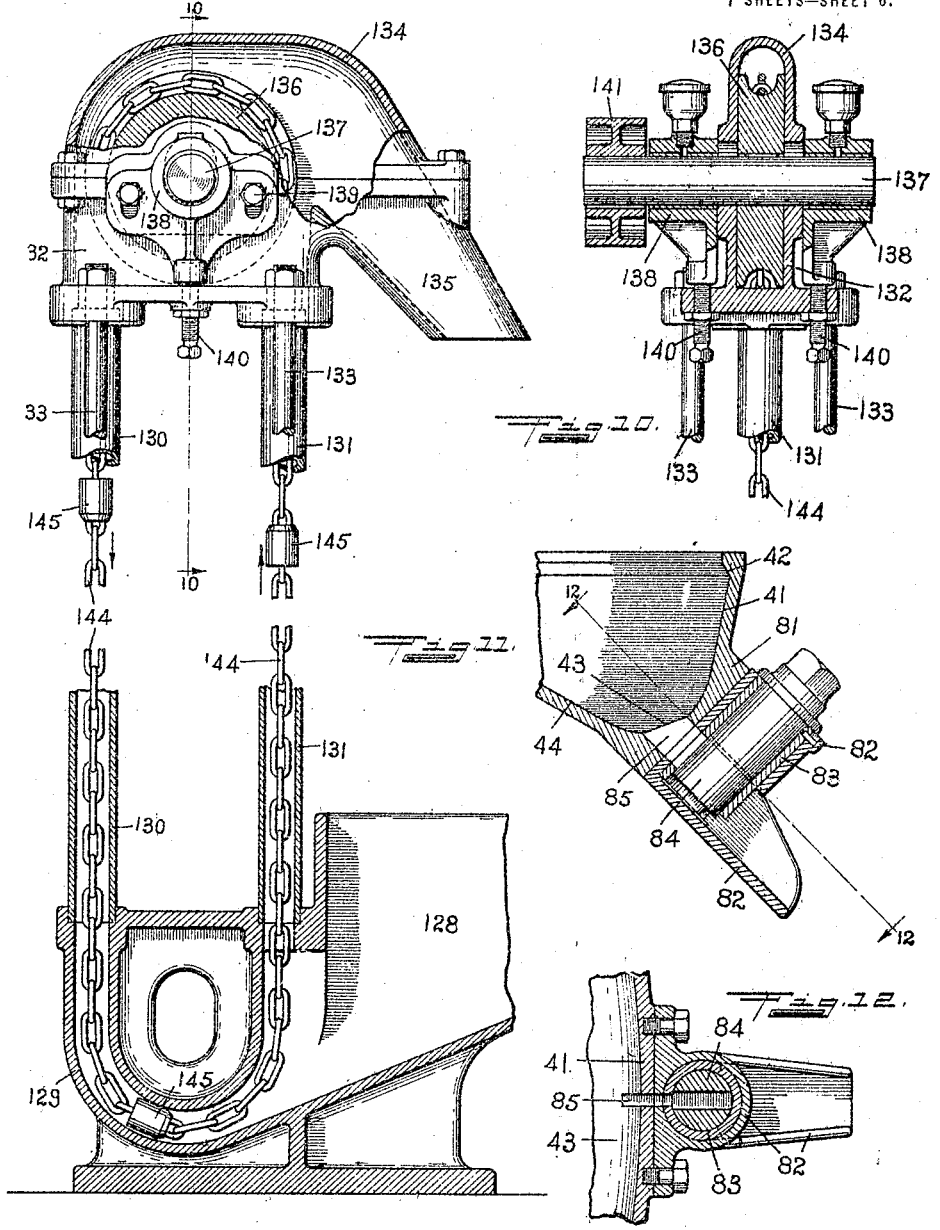

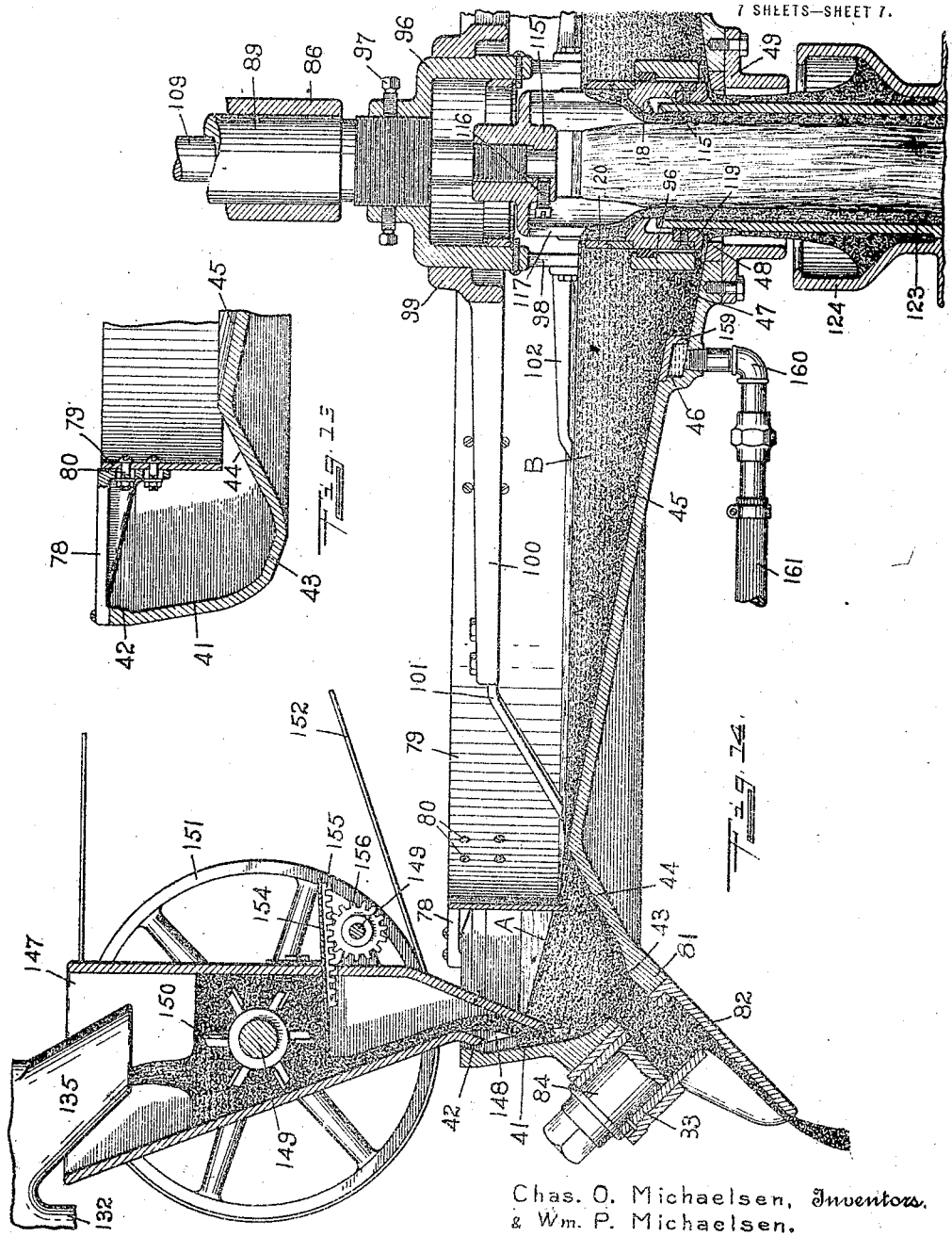

CHARLES O. MICHAELSEN AND WILLIAM P. MICHAELSEN, OF MINNEAPOLIS, MINNESOTA, ASSIGNORS TO MICHAELSEN MACHINERY COMPANY, A CORPORATION OF NEVADA.

MINERAL-CONCENTRATOR.

1,269,198.   Specification of Letters Patent.   Patented June 11, 1918.

Application filed September 7, 1916. Serial No. 118,939.

*To all whom it may concern:*

Be it known that we, CHARLES O. MICHAELSEN and WILLIAM P. MICHAELSEN, both of Minneapolis, in the county of Hennepin and State of Minnesota, have invented certain new and useful Improvements in Mineral-Concentrators, of which the following is a specification.

Our invention relates to mineral concentrators for use in separating the valuable metalliferous constituents from crushed or pulverized ores or placer sands. It is the object of our invention to provide an efficient and economically operable machine of this kind, capable of handling all varieties of materials of the kind mentioned, having means for effecting a continuous separation of the mineral and waste products, and wherein each of the two classes of material are discharged from the machine substantially pure and unmixed with any appreciable proportion of material of the other class. More particular objects of our invention are to provide regulatable means for continuously feeding materials to the machine; to provide a separation-pan oscillatable about a vertical axis and into which the materials are fed at the peripheral portion thereof; to provide actuating means for rapidly oscillating said pan; to provide means forming a waste-discharge opening at the upper central portion of the pan; to provide means at the peripheral portion of the pan for either continuously or intermittently discharging the concentrates; to provide means forming an opening at the lower central part of the pan for discharging partially-concentrated material; to provide means for returning said partially-concentrated material to the peripheral part of the pan; to provide regulatable means for stirring or agitating and loosening the solid materials in the pan so as to keep the same in partial suspension in the water or washing medium therein; to provide means for submerging slimes and finely divided material containing valuable matter so that the latter will pass beneath a blanket or suspended layer of waste matter and pass off with the other concentrates; and to provide various other particular constructions and combinations of mechanism, which will be hereinafter fully set forth.

In the accompanying drawings Figure 1 is a partial plan view of a machine embodying our invention, Fig. 2 is a transverse vertical sectional view of the same, Fig. 3 is a longitudinal vertical sectional view thereof, Fig. 4 is a detail transverse vertical section, showing the central portion of the machine on a larger scale than in Fig. 2, Fig. 5 is a detail vertical section through the driving-head of one of the side-rods, Fig. 6 is a detail horizontal section through the other head of said rod, Fig. 7 is a detail plan view of one of the pan-centering and supporting devices, Fig. 8 is a detail vertical section on the plane of the line 8—8 of Fig. 7, Fig. 9 is a detail vertical section through the elevating pump mechanism, Fig. 10 is a detail transverse section on the plane of the line 10—10 of Fig. 9, Fig. 11 is a detail vertical section through one of the concentrates-discharge valves, Fig. 12 is a section of the same on the diagonal plane of the line 12—12 of Fig. 11, Fig. 13 is a detail vertical section of a portion of the pan, showing the means for vertically adjusting the submersion-ring, and Fig. 14 is a detail vertical sectional view showing the distribution of material in the pan when the machine is in operation.

In the illustrated embodiment of our invention we provide a main frame consisting principally of parallel side-members 20 and cross-members 21 extending transversely between the ends thereof and rigidly secured thereto. The side-members have foot-portions 22 which rest upon a suitable base or foundation and at one end have bracket-like portions 23 extending beyond the adjacent cross-member. On the upper sides of said bracket-portions are secured bearings 24 in which is journaled the main driving-shaft 25. On said shaft, between the bearings, there is mounted a pulley 26 which is connected by belt with a suitable source of power. Fly-wheels 27 are mounted on the shaft adjoining the outer ends of the bearings 24, and outside the fly-wheels there are secured eccentrics 28 which are employed, as hereinafter described, for actuating the oscillating pan. At one end the shaft 25 carries a small cone-step pulley 29, from which the upper or cross-shaft is driven, as will appear below.

On the upper side of each of the frame side-members 20, at the intermediate portion thereof, there are secured the foot-portions of a bracket 30 having approximately the form of an inverted U. To the upper portions of the brackets 30 are secured the ends of the cross-beam 31, and on said cross-beam are mounted bearings 32 and 33 in which is journaled the cross-shaft 34. At one end said cross-shaft carries a cone-step pulley 35 which is connected with the pulley 29 by means of a belt 36.

At each of the four corners formed by the juncture of the frame members 20 and 21, there is secured on the upper sides thereof one of the angle-plates 37 shown in detail in Figs. 7 and 8. Each of the angle-plates has at its inner side a lug 38 having secured therein a stud 39 which extends in horizontally and has revolubly mounted thereon a roller 40. Said rollers 40 form the supporting means for the oscillating separation-pan, the axes of the rollers extending radially to the pan and the same being movable about a vertical axis. The margin or outer rim 41 of the separation-pan has an inwardly-extending lip 42 at its upper edge, and from said lip the rim extends downwardly, sloping inward slightly, and at its lower edge merges into a rounded portion 43 which is the bottom of an annular trough or channel. The inner side of the annular trough is formed by an upwardly inclined or sloping portion 44 which rises to a height somewhat less than half the height of the outer rim above the bottom of the trough. The inner edge of the portion 44 merges into the margin of a conical or downwardly and inwardly inclined part 45, which slopes gently toward the center or vertical axis of the pan. The part 45 terminates at a downward offset or shoulder 46 which forms the rim of a central pocket or bowl, of which the bottom 47 extends in at the same inclination as the part 45 and ends at the edge of a circular central opening through the bottom of the pan. Within said central opening there is arranged a seat-ring 48 which is preferably made of a hard, non-corrosible and wear-resisting material such as Monel metal. The seat-ring is retained in the opening by means of a ring 49 secured to the bottom of the pan by screws 50, said ring having a cylindrical downwardly-extending flange at the inner edge thereof, as shown. On the lower side of the rounded part 43 there are plane-surfaced bosses 51, to which are secured hard wearing-plates 52. Said plates 52 rest upon the rollers 40 which sustain the pan so that it may have a free rotational movement in a horizontal plane about its vertical axis. The pan is centered, or retained against lateral movement, by the following means: On the outer side of the rim 41 there are bosses or projecting portions 53 having cylindro-segmental surfaces on which are secured arcuate wearing-plates 54 of hard material. Each of the angle-plates 37 has an upwardly extending flange-portion 55 with inwardly-extending lugs 56 at the ends thereof, and between said lugs there is held a block 57 of which the inner face is adapted to fit against and form a bearing for the wearing-plate 54 on the adjacent boss 53 of the pan. The bearing-blocks 57 are held by screws 58 extended through the lugs 56, and may be adjusted radially of the pan by means of screws 59 extending through the flange-portions 55 and engaging the blocks, as shown.

At opposite sides of the pan, beneath the cross-beam, there are projecting lugs 60 on the rim 41, and onto said lugs are fitted and secured the flanged base-portions of arms 61 which extend laterally therefrom and carry at their ends cylindrical heads 62. Said arms 61 pass out through the spaces between the foot-portions of the brackets 30 which support the cross-beam, and the heads 62 are located outside of said brackets as indicated in Fig. 2. The eccentrics 28 on the main driving shaft are connected yieldingly with the heads 62 by means of side-rods of which the detailed construction is shown in Figs. 5 and 6. Around each of the eccentrics 28 there is fitted a two-part box consisting of parts 63 and 64 within which the eccentric is revoluble. The box-part 63 is retained within a U-shaped head or yoke 65 by means of screws 66, and the box-part 64 has projecting lugs at its upper and lower sides which fit against the end of the yoke and are secured thereto by screws 67. At the other end of the yoke there is a projecting portion which fits between the upper and lower parts of a forked head 68, the same being pivotally connected with the yoke by a vertically-extending pin 69 passing through the parts as shown in Fig. 5. Into the neck-portion of the head 68 there is screwed the end of a rod 70, said rod extending horizontally therefrom and passing loosely through the central opening of the head 62 at the respective side of the pan. Coil springs 71 and 72 are disposed around the rod at opposite sides of the head 62, the ends of the springs resting in recesses in the ends of the head. The springs are held under a certain compression by collars 73 and 74, which are screwed on threaded portions of the rod, each collar having a sleeve-portion integral therewith, inclosing the respective spring and fitting slidably over the adjoining end of the head 62, as shown in Fig. 6. Locknuts 75 and 76 are disposed on the threaded parts of the rod adjoining the respective collars 73 and 74, for retaining the collars in adjusted positions, and a similar locknut 77 is disposed adjoining the head 68. The throw of the eccentrics 28 is equal, and the eccentrics are arranged with their centers on opposite sides of the axis of the shaft 25, so that the movements imparted thereby to the side-rods 70 are equal and opposite in direction. During rotation of the shaft 25 the eccentrics cause, of course, certain oscillatory movements of the side-rods in a vertical plane, but the openings through the heads 62 are large enough to permit such movement without causing binding or swinging of the parts. The movements of the side-rods cause oscillatory movements of the separation-pan about the vertical axis thereof, and, as the heads 62 are moved in arcuate paths about the axis of the pan, there are caused slight lateral movements of the side-rods. The joint formed by the pin 69 between the head 68 and yoke 65 permits such lateral movements to be made without causing binding of the box-parts on the eccentric. If both of the springs 71 and 72 are the same at both sides of the machine, the oscillatory movements of the pan will be alike in each direction, but the extent of the movements will vary slightly according to the strength of the springs and the rate of movement. Thus, when the rate of rotation of the driving eccentrics is slow enough so that the inertia of the pan can be overcome without causing increased compression of the springs either in starting or stopping, the extent of movement will be the same as the throw of the eccentrics. But when the rate of rotation of the eccentrics exceeds a certain limit, then in overcoming the inertia of the pan at the limits of movement thereof the springs will be compressed beyond their normal or initial compression, and the extent of the movements imparted to the pan will no longer correspond exactly to the throw of the eccentrics. A further modification of the movement may be effected by making the opposing springs of different flexibility. Thus, if the spring 71 at one side of the machine, and the spring 72 at the other side, are more flexible than the respectively-opposed springs, the movements of the pan in one direction will be stopped more abruptly than the movements in the opposite direction, the more abrupt stopping being effected at the end of the stroke at which the movement is opposed by the stiffer springs. The described modification of the simple harmonic oscillatory movement is made use of for a purpose which will appear hereinafter.

To the rim of the pan, on top of the lip 42, there are secured the ends of a plurality of L-shaped arms 78 which extend radially inward, the angle-portions thereof depending vertically at the inner ends, and said angle-portions having vertically-elongated openings therein, as best shown in Fig. 13. To said arms 78 the submersion-ring 79 is secured by bolts 80 passing through the ring and the slots in the arms, as shown, the ring being thereby held concentric with the pan, and with its lower edge extending into the inner portion of the annular trough. The ring may be adjusted vertically between positions such that its lower edge is slightly above or slightly below the level of the crest at the juncture of the portions 44 and 45 of the pan.

On the lower and outer side of the bottom-portion 43 of the annular trough, at positions intermediate the lugs 60 for the side-arms 61, there are bosses 81 having inclined plane surfaces on which are secured the valved discharge-spouts 82, shown in detail in Figs. 11 and 12. In each of the spout-bodies there is a cylindrical opening extending parallel with the face of the boss 81, and in said opening is disposed a tubular bushing 83 within which a valve-body 84 fits revolubly. The bushing and valve-body terminate near the inclined bottom-portion of the spout, and the valve-body has in its lower end a transverse slot adapted to register with a slot 85 that extends through the inner side of the bushing 83 and continues through the pan-portion 43 to the lower and outer portion of the annular trough. The valves may be turned so as to stop off the passages through the slots 85, or to open the same to any extent desired.

At the center of the cross-beam 31 there is a large circular opening through which is extended a vertical bearing 86 formed integrally with a plate 87 which rests on top of the cross-beam and is secured thereto by bolts 88. In the bearing 86 there is revolubly disposed a tubular shaft 89 having at its upper end an integral flange-portion 90. Between the flange-portion 90 and the plate 87 an annular ball-thrust-bearing 91 is arranged as shown. The ball-thrust-bearing is surrounded by a flange 92, integral with the plate 87, and forming a receptacle for the retention of a lubricant for the bearing, supplied from an oil-cup 93 arranged below the plate 87, as shown clearly in Fig. 4. To the flange 90 of the tubular shaft there is secured a bevel gear 94 which meshes with a bevel pinion 95 secured on the cross-shaft 34 so as to be driven therefrom. The lower end-portion of the tubular shaft 89 is threaded to receive the upper end-portion of a cylindrical shell 96, which is screwed thereon and held in fixed relation thereto by set-screws 97. The lower end of the shell 96 extends into proximity to the bottom 47 of the central pocket or bowl-portion of the separation-pan, and the intermediate side-portions of the shell have therein several vertically-extending rectangular ports or openings 98. Around the upper part of the shell 96, above the ports 98, there is clamped a two-part collar 99 having several radially-extending arms 100. To the outer portions of said arms are secured downwardly-inclined and terminally-curved fingers 101 which extend below the lower edge of the submersion-ring 79 and into the annular trough-portion of the pan, so as to sweep the rounded bottom of the trough and the sloping inner side 44 thereof. Below the clamp-collar 99, at successively lower levels on the intermediate and lower portions of the shell 96, there are secured a series of arms 102, 103, 104 and 105 which extend out radially from the shell, and of which the outer ends are movable in proximity to the surfaces of the inclined pan-portions 45 and 47.

A rod 106 extends slidably through the tubular shaft 89, and the upper end of said rod 106 is connected with a two-part rectangular yoke 107, the sides of which engage slidably the sides of a bearing-block 108 mounted on the cross-shaft 34, as shown. A screw 109 extends through a threaded vertical opening in the upper end-portion of the yoke 107, the lower end of the screw having an annular flange 110 which fits revolubly in a socket-plate 111 secured on the upper side of the bearing-block 108. At the upper end of the screw 109 a spoked hand-wheel 112 is secured thereon, so that the screw may be turned by means of said wheel. On the portion of the screw 109 above the yoke there is a locknut 113 screwed thereon, said locknut being integral with and forming the hub-portion of a spoked hand-wheel 114. By suitable manipulation of the two hand-wheels, the yoke 107 and rod 106 may be raised and lowered, and secured in adjusted relations to the cross-shaft and bearing-block 108. At the lower end of the rod 106 the same has a threaded portion on which is screwed the upper part of a cylindrical shell 115, the same being held in fixed relation to the rod by a set-screw 116 arranged as shown. In the sides of the shell 115 are a series of ports 117 corresponding to the ports 98 in the shell 96, and below the ports there is an inwardly-extending conular lip 118. The lower end of the shell 115 has secured thereon a valve-ring 119 adapted to seat against the ring 48 to stop off the opening through the same, and by the above described raising and lowering of the rod 106 any desired width of opening may be established between the rings 119 and 48. The portion of the shell 115 below the ports 117 is slightly larger in diameter than the portion containing said ports, and there are provided a series of shouldered stop-rings 120 which fit slidably on said ported portion of the shell. The shouldered ends of the stop-rings overlap each other when fitted together, as shown clearly in Fig. 4, and said rings are employed to stop off the lower portions of the ports 117 to raise the level at which fluid materials in the separation-pan can flow through said ports to the inside of the shell. When the stop-rings are not in use for the described purpose, they are raised up into the upper part of the outer shell 96, and held in said raised position by means of screws 121 extended through the sides of said shell, as shown. Below the ports 98 and 117 a packing-ring 122 is arranged so as to fill and stop off the annular space between the shells 96 and 115.

Materials flowing from the pan inwardly through the ports 98 and 117, pass down within the shell 115 and are directed by the conular lip 118 into the upper end of a discharge-pipe 123. Said pipe passes through the seat-ring 48 and flanged-ring 49 concentrically therewith but in spaced relation to the sides thereof, so that an annular opening is left around the pipe for the escape of materials which flow between the rings 48 and 119. Such materials are directed by the depending flange of the ring 49 into the mouth-portion of a receiving-funnel 124, which surrounds the pipe 123 and has a discharge-outlet 125 at one side thereof. The funnel 124 has a flanged base-portion which rests upon and is secured to the central part of an arched cross-beam 126, the ends of said cross-beam being supported on the lower horizontal portions of the frame side-members 20. The pipe 123 has an integral annular flange 127 which fits against and is secured to the base-portion of the funnel.

The outlet or discharge-spout 125 of the funnel empties into the upper portion of an inclined trough or chute 128 which extends diagonally to the sump-casing 129 of an elevating pump mechanism which is arranged at the same end of the machine as the main driving shaft 25. Said sump-casing 129 is integral with the chute 128, and has therein a U-shaped passage communicating at one side with the lower end of the chute, as shown in Fig. 9. At the upper ends of the U-shaped passage the casing has sockets in which are fitted the lower ends of pipes 130 and 131 which extend upwardly therefrom, passing on opposite sides of the driving-shaft 25. Said pipes at their upper ends fit into sockets in the head-casing 132, and the casings 129 and 132 are secured to each other by long bolts 133 which extend alongside the pipes and are connected with flanges at the sides of the sockets. The head-casing 132 has a removable cover 134, and at one side thereof has a discharge-spout 135. Within the casing there is a peripherally-grooved wheel 136 secured on a shaft 137 which extends transversely through the casing and has the ends thereof journaled in bearings 138. Said bearings are secured to the sides of the casing by screws 139 which pass through vertically-elongated openings, the bearings being adjustable vertically by means of screws 140 which pass through flanges at the lower edge of the casing and engage the lower portions of the bearings as shown in Figs. 9 and 10. On one end of the shaft 137 there is secured a small pulley 141 which is connected by a belt 142 with a pulley 143 on the main shaft 25, so as to be driven therefrom. An endless chain 144 passes over the wheel 136, extending therefrom down through the pipe 130, through the U-shaped passage of the sump-casing 129, and up through the pipe 131 to the wheel. On said chain at suitable intervals there are secured plungers 145 adapted to fit within the pipes, so that when the chain is moved by rotation of the wheel materials will be carried up through the pipe 131 from the sump-casing to the head-casing, and discharged therefrom through the spout 135.

To the intermediate portions of the frame cross-members 21 there are secured pairs of bracket-arms 146 which extend upward and diagonally outward therefrom, past the adjacent marginal portions of the separation-pan, and to the upper portions of each pair of said arms is secured one of the feed-hoppers 147. The lower ends of said hoppers have nozzle-like portions 148 which extend down into the annular trough-portion of the pan, opening toward the rim 41, as shown. Materials elevated by the pump mechanism are discharged by the spout 135 into one of said feed-hoppers, and other materials are supplied thereto as hereinafter set forth. In the ends of each hopper there are bearings for a shaft 149 which extends horizontally through the hopper and carries a series of agitating-paddles 150 on the intermediate portion thereof. The shafts 149 carry at one end pulleys 151 which are connected by belts 152 with pulleys 153 mounted on the cross-shaft 34 adjoining the bearings 33, the arrangement being such that the agitator-shafts 149 are driven from the cross-shaft in the directions indicated in Fig. 3. In each hopper, below the agitating-paddles, there is arranged a plate 154 which extends slidably through the inner side of the hopper, and which has on the lower side thereof rack-bars 155 meshing with pinions 156 carried on a shaft 157 extending horizontally beneath the plate at the side of the hopper. The shafts 157 are journaled in suitable bearings at the ends of the hoppers, and each shaft has at one end a hand-wheel 158 by which it may be turned to move the respective plate 154, through the medium of the pinions and rack-bars. The plates 154 are, in effect, valves which enable regulation of the flow of material from the feed-hoppers to the separation-pan.

Besides the materials supplied to the machine through the feed-hoppers, there may be supplied thereto limited quantities of water, as follows: At the shoulder 46 of the pan, there is secured therein an angle-ring 159 which incloses an annular space between the same and the bottom of the pan. A pipe 160 is screwed into an opening in the bottom of the pan communicating with said annular space, and water from a hose or flexible pipe 161 is supplied through the pipe 160 to said annular water-space. The lower edge of the angle-ring is recessed so as to be in contact with the bottom of the pan at only a few points, and between said contact-points there are left, between the ring and pan-bottom, very narrow slot-like openings through which the water from the annular space may pass into the central bowl-portion of the pan, adjoining the margin of the bottom 47 thereof, so as to be uniformly distributed around the edge of said bowl-portion of the pan. A water-supply pipe 162 is connected with one side of the funnel 124, as shown in Figs. 2 and 4, and water supplied through said pipe is employed for flushing solid material out of the funnel.

The detailed operation of the described mechanism is varied according to the class of material being handled thereby. To attain the most satisfactory results in a machine proportioned as shown in the drawings, and in which the diameter of the separation-pan is about 60 inches, the main drive-shaft should be driven at a speed of 250 to 300 revolutions per minute, and the extent of the oscillatory movement of the pan at the marginal portion thereof should be about one inch. The springs 71 and 72 are preferably proportioned as hereinbefore mentioned, so that the movement of the pan in one direction will be stopped more abruptly than the movements in the other direction, as by this means the oscillatory movements have a tendency to work the materials around the pan in the direction of the movements which terminate most abruptly. The rate of movement of the cross-shaft 34, from which are driven the rotary agitating arms carried by the shell 96, is varied as required, by placing the belt 36 on different portions of the cone-step-pulleys 29 and 35. Variation of the rate of movement of the cross-shaft 34 causes a similar variation of the rate of movement of the agitating devices in the feed-hoppers. The rate of movement of the elevating pump mechanism is always proportional to the speed of the main drive-shaft 25, the mechanism being so proportioned that at such speed the pump will have ample capacity to raise the maximum required volume of material.

When first commencing the operation of the machine, the central part of the pan is filled with clean sand to the overflow level of the ports 117 as determined by the stop-rings 120, and the annular trough-portion of the pan is also filled to a level above the lower edge of the submersion-ring 79. The shell 115 is lowered, by manipulation of the hand-wheels 112 and 114, to stop off the opening between the rings 48 and 119; the valves 84 are closed; and the pan is filled with water to the overflow level. Power is then applied to the main drive-shaft, and the shaking or oscillation of the pan, together with the agitation caused by the movement of the rotary arms 101, 102, 103, 104 and 105, causes the sand to be kept in suspension in the water, so that the pan is filled with a semi-fluid mixture of sand and water, the consistency of which may be described as approximately that of quicksand. The rotational movement causes this semi-fluid material to pile up more or less toward the outer edge of rim 41, so that the surface of the material in the annular trough-portion of the pan is inclined inwardly approximately as indicated at A in Fig. 14. After the described preparation, or "priming" operations, the placer sand, or the crushed and pulverized ore containing the valuable mineral to be recovered, is supplied to the feed-hoppers together with a suitable quantity of water, and the feeding of said material from the hoppers to the pan is regulated as desired, by adjustment of the positions of the valve-plates 154. As the material from the feed-hoppers passes therefrom through the nozzle-portions 148 into the annular trough-portion of the pan, said material is directed by the nozzle-portions against the rim 41 and quickly becomes distributed with substantial uniformity around the entire peripheral portion of the pan. The lip 42 at the upper edge of the rim 41 assists in preventing splashing of the material over the edge of the rim, by tending to direct inwardly any of the material that may be thrown upwardly along the inner surface of the rim. As the materials enter the marginal portion of the pan they at once begin to be shaken in a horizontal plane by the oscillatory movements of the pan, and said shaking or agitation of the material causes the heavier metalliferous portions thereof to begin to settle and pass beneath the lighter non-metalliferous portions, so that a large proportion of the valuable mineral constituents of the ore pass almost immediately to the bottom of the annular trough. Besides the settling or gravitational movement of the heavy material there is a slight centrifugal action, due to the rotational component of the oscillatory movement, which causes the portions of greatest specific gravity to tend to accumulate toward the outer part of the bottom of the annular trough. The incoming materials from the feed-hoppers gradually displace the sand and water with which the pan is filled at the beginning of the operation, and said "priming" materials pass inwardly toward the center of the pan, eventually reaching the ports 117 and flowing through the same to the waste-pipe 123. As the priming sand is displaced, however, the waste material from the ore constantly replaces the same, so that during the operation of the machine the body of the pan is constantly filled to the overflow level with a semi-fluid mass or "blanket" of loose granular solid material suspended or partially suspended in water.

After the feeding of the ore has been commenced and continued for a time such that the material lying against the bottom 43 of the annular trough consists almost entirely of valuable mineral constituents, the valves 84 are opened slightly so as to feed off said material through the slots 85 and spouts 82 at a rate equal to that at which said constituents are being separated from the ore. In some cases, as where a very small proportion of the mineral is being separated, the concentrates may be discharged by opening the valves 84 intermittently.

A certain portion of the valuable constituents of the ore will, of course, pass inwardly from the annular trough, over the crest formed at the juncture of the pan-portions 44 and 45, and on in toward the center of the pan. Such valuable material, however, being heavier than the waste material, will constantly tend to descend through the mass of waste material and will eventually reach the surface of the pan-body, thence passing along the bottom thereof toward the center. After the operation of the machine has been continued long enough for some of said valuable mineral constituents to have reached the central bowl-portion of the pan, the shell 115 is raised slightly so as to afford an opening between the valve-ring 119 and seat-ring 48; and thereafter a constant flow of material is permitted through said opening, the extent of which is so regulated that the material thus drawn off will include all of the valuable mineral constituents of the ore except such as have been retained in the annular trough. The material drawn off through the bottom opening of the pan will include, of course, a considerable proportion of waste material, but as all of said material is returned by the elevating pump mechanism to one of the feed-hoppers, there will be no loss of the valuable constituents. Thus, by suitably regulating the operation of the machine, the valuable constituents of the ore may be obtained at the spouts 82 substantially unmixed with any waste matter, and the waste matter discharged through the pipe 123 entirely freed from any valuable constituents.

The submersion-ring 79 has an important function in the operation, by preventing the admission of any material to the central part of the pan directly from the surface-portion of the material in the outer part of the annular trough. The lower edge of the ring being constantly submerged, it is obvious that all the material that enters the central portion of the pan must become submerged in passing beneath said lower edge of the ring. Now in certain classes of ores a considerable part of the mineral values are found in a state of minute subdivision and are mixed with waste material which is also finely divided, and said materials when mixed with water form "slimes" which will float on the surface of the material, holding the mineral values in suspension and tending to prevent the separation thereof from the waste matter. We have found, however, that when such slimy material is once submerged, so as to pass beneath the surface of the before-mentioned "blanket" of suspended sand or waste material, the mineral values thereof are separable from the waste in the same manner as the coarser values, and will pass to the bottom of the pan so as to be recoverable directly with the coarser values.

For use of the machine in recovering the values from placer sands and crushed and pulverized free-milling ores, wherein all the values are in the form of amalgamable metallic particles, the discharge-valves 84 may be closed and a quantity of quicksilver disposed in the annular trough-portion of the pan. In said quicksilver the valuable metallic particles will amalgamate as the same are brought into contact therewith, while sand and valueless material will be washed away and eventually pass off through the central waste-pipe 123. Any valuable material that escapes amalgamation when first introduced into the pan, will descend to the bottom of the pan in passing in toward the center thereof, and will be drawn off at the bottom-opening between the rings 48 and 119, thence passing to the elevating pump and being thereby returned to the feed-hopper so as to be again subject to amalgamation. When the machine is operated in this manner, it is stopped at suitable intervals and a "clean-up" made of the amalgam, as usual in amalgamation processes.

It may be noted that under average conditions of operation about 75% of the valuable material fed to the annular trough will be immediately retained therein; that the remainder of the valuable material may be recovered at the central bottom-opening of the pan in a partially-concentrated condition, being mixed with a certain proportion of waste matter; and that, when the machine is properly adjusted and operated in accordance with the characteristics of the material handled, there is a constant elimination of waste matter at the upper central opening of the pan through the ports 98 and 117.

By the employment in the one machine of what may be designated as a primary and a secondary separation or concentration of the materials, it is possible to so regulate the operation that the primary concentrates are substantially clean and unmixed with any waste material, without danger of ultimate loss of any valuable material, as all of such material lost in the primary separation may be recovered in the secondary separation, and in the product of the latter a sufficient quantity of waste matter may be included to insure the retention of all values.

Now, having described our invention, what we claim and desire to secure by Letters Patent is:

1. In a mineral concentrator, a pan mounted to oscillate about a vertical axis, said pan having an annular trough disposed marginally thereof and the bottom of the pan sloping inwardly and downwardly from the inner edge of said annular trough, means for feeding materials into said annular trough, means forming a discharge outlet from the bottom of said annular trough, means forming two outlets from the pan at the central part thereof, one of said outlets being at a higher level than the other, and means for receiving materials from the lower of said outlets and returning the same to the annular trough.

2. In a mineral concentrator, a circular pan mounted to oscillate horizontally about a fixed vertical axis, said pan having a concave central portion terminating marginally in a crest concentric with the pan-rim, and a concave-bottomed annular trough between said crest and rim, means forming a waste-discharge passage opening to the central part of the pan above the bottom thereof, means forming a central discharge-opening at the lowermost bottom-portion of the pan, means for elevating and conveying materials from the latter discharge-opening to the annular trough, and valve-controlled means for discharging concentrates from the bottom of the annular trough.

3. In a machine of the class described, a pan mounted to oscillate about a vertical axis, said pan having an annular conical portion, an annular trough encircling said conical portion and adapted to overflow uniformly onto the upper peripheral part thereof, and an outer rim extending above the level of the inner margin of the trough, a continuous baffle-ring supported from the upper part of the outer rim and disposed concentrically therewith and so as to dip into the annular trough to a level below the inner margin thereof, and means for feeding materials into the trough between the outer rim and the baffle-ring, whereby said materials pass beneath the submerged lower edge of the ring before flowing onto the conical pan-portion.

4. In a machine of the class described, a horizontally disposed pan mounted to oscillate about a vertical axis, said pan having an annular conical concave portion, an axial opening through the bottom thereof, and an annular trough surrounding said conical portion, a tubular rotary member disposed axially of the pan, a cross-shaft extending transversely above the pan, driving connections between said cross-shaft and tubular member, sweep-arms connected with said member and having portions movable in the annular trough, means for feeding materials into the trough so that the same will flow therefrom inwardly over the surface of the conical portion, a discharge-pipe extending through the bottom-opening of the pan in spaced relation to the edges of said opening, a tubular valve-member disposed around the upper portion of the discharge-pipe and adapted to stop-off the opening around said pipe through the bottom of the pan, means extending up from said valve-member through the tubular rotary member and connecting with the cross-shaft to support the valve-member therefrom, and means for varying the relation of said connecting means and the cross-shaft to raise and lower the valve-member and vary the extent of the opening around the discharge-pipe.

5. In a machine of the class described, a horizontally disposed pan comprising an annular trough having a substantially cylindrical outer rim, and a relatively flat conical body-portion sloping inwardly and downwardly from the inner margin of the annular trough, said inner margin of the trough being lower than the outer rim whereby fluid materials placed in the trough will fill the same to the level of said margin and then flow inwardly over said margin and down the sloping body-portion toward the center of the pan, a continuous baffle-ring arranged to dip within the annular trough and extend below the level of the inner margin thereof, means for feeding materials into the trough outside the baffle-ring, whereby said materials must pass beneath said ring in flowing to the inner margin of the trough, means for agitating materials within the pan, means forming an annular discharge opening at the central lowermost portion of the pan, and means forming a discharge passage at the center of the pan and opening thereto at a higher level than that of the first-named discharge passage.

6. In a mineral concentrator, an oscillatory separation pan having a marginal depression and a central depression, means for feeding materials into the marginal portion of the pan, means for controlling overflow of materials from said marginal portion into the central portion, means for discharging concentrates from the bottom of the marginal depression, means for discharging waste material from the upper part of the central portion of the pan, means for discharging partially-concentrated material from the bottom of the central depression, and means for returning said partially-concentrated materials to the marginal portion of the pan.

7. In a mineral concentrator, in combination, primary separation means comprising an oscillatory receptacle, means for feeding materials thereto, means for discharging concentrates from the bottom thereof, and means for controlling a marginal overflow of materials therefrom; secondary separation means comprising a receptacle receiving the overflow from the primary receptacle, means for agitating said materials, means for discharging partially-concentrated materials from the bottom thereof, and means for discharging waste material at a level above that for discharging the partially-concentrated materials; and means for returning the partially-concentrated materials to the primary separation means to be rehandled therein.

CHARLES O. MICHAELSEN.
WILLIAM P. MICHAELSEN.